United States Patent
Harada et al.

(10) Patent No.: US 9,937,777 B2
(45) Date of Patent: Apr. 10, 2018

(54) BELT MOLDING

(71) Applicant: SHIROKI CORPORATION, Fujisawa-shi (JP)

(72) Inventors: Takashi Harada, Fujisawa (JP); Katsuhisa Fukui, Fujisawa (JP); Yasuhisa Suzuki, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 0 days.

(21) Appl. No.: 15/097,103

(22) Filed: Apr. 12, 2016

(65) Prior Publication Data

US 2016/0311141 A1    Oct. 27, 2016

(30) Foreign Application Priority Data

Apr. 23, 2015 (JP) ................. 2015-088223

(51) Int. Cl.

| | |
|---|---|
| *B29C 45/00* | (2006.01) |
| *B60J 10/18* | (2016.01) |
| *B60J 10/75* | (2016.01) |
| *B29C 47/00* | (2006.01) |
| *B60J 10/16* | (2016.01) |
| *B29K 23/00* | (2006.01) |
| *B29L 31/30* | (2006.01) |
| *B29L 31/26* | (2006.01) |
| *B29L 31/00* | (2006.01) |
| *B29C 47/06* | (2006.01) |

(52) U.S. Cl.
CPC ............ *B60J 10/18* (2016.02); *B29C 47/003* (2013.01); *B60J 10/16* (2016.02); *B60J 10/75* (2016.02); *B29C 47/062* (2013.01); *B29C 47/065* (2013.01); *B29K 2023/12* (2013.01); *B29L 2031/006* (2013.01); *B29L 2031/265* (2013.01); *B29L 2031/302* (2013.01)

(58) Field of Classification Search
CPC .. B60J 10/18; B60J 10/16; B60J 10/75; B29C 47/003; B29C 47/065; B29L 2031/265; B29L 2031/006
USPC ........................................ 296/146.2
See application file for complete search history.

(56) References Cited

U.S. PATENT DOCUMENTS

| | | | |
|---|---|---|---|
| 7,390,050 B2 * | 6/2008 | Nakao ............. | B60R 13/04 296/146.1 |
| 8,104,227 B2 * | 1/2012 | Tamura ............. | B60J 10/18 49/377 |

FOREIGN PATENT DOCUMENTS

JP    2010-285130 A    12/2010

* cited by examiner

*Primary Examiner* — Joseph D. Pape
*Assistant Examiner* — Dana D Ivey
(74) *Attorney, Agent, or Firm* — McGinn I.P. Law Group, PLLC.

(57) ABSTRACT

A belt molding includes: a molding body, which includes an inner wall, an outer wall, and a connection wall that connects an upper end of the inner wall and an upper end of the outer wall; a design lip, which is formed at the upper end of the inner wall of the molding body; and a design portion, wherein the design portion includes a first portion, which covers at least a part of the molding body, and a second portion, which covers at least a part of the design lip, and wherein a step is formed between the first portion and the second portion, such that a level of a surface of the first portion is different from a level of a surface of the second portion.

20 Claims, 6 Drawing Sheets

BELT MOLDING

CROSS-REFERENCE TO RELATED APPLICATION

This application claims priority from Japanese Patent Application No. 2015-088223 filed on Apr. 23, 2015, the entire subject matter of which is incorporated herein by reference.

TECHNICAL FIELD

This disclosure relates to a belt molding that abuts and slides on a surface of a sliding glass that moves up and down with respect to a vehicle door in order to remove dirt and water on the surface of the sliding glass.

BACKGROUND ART

Figure 5:
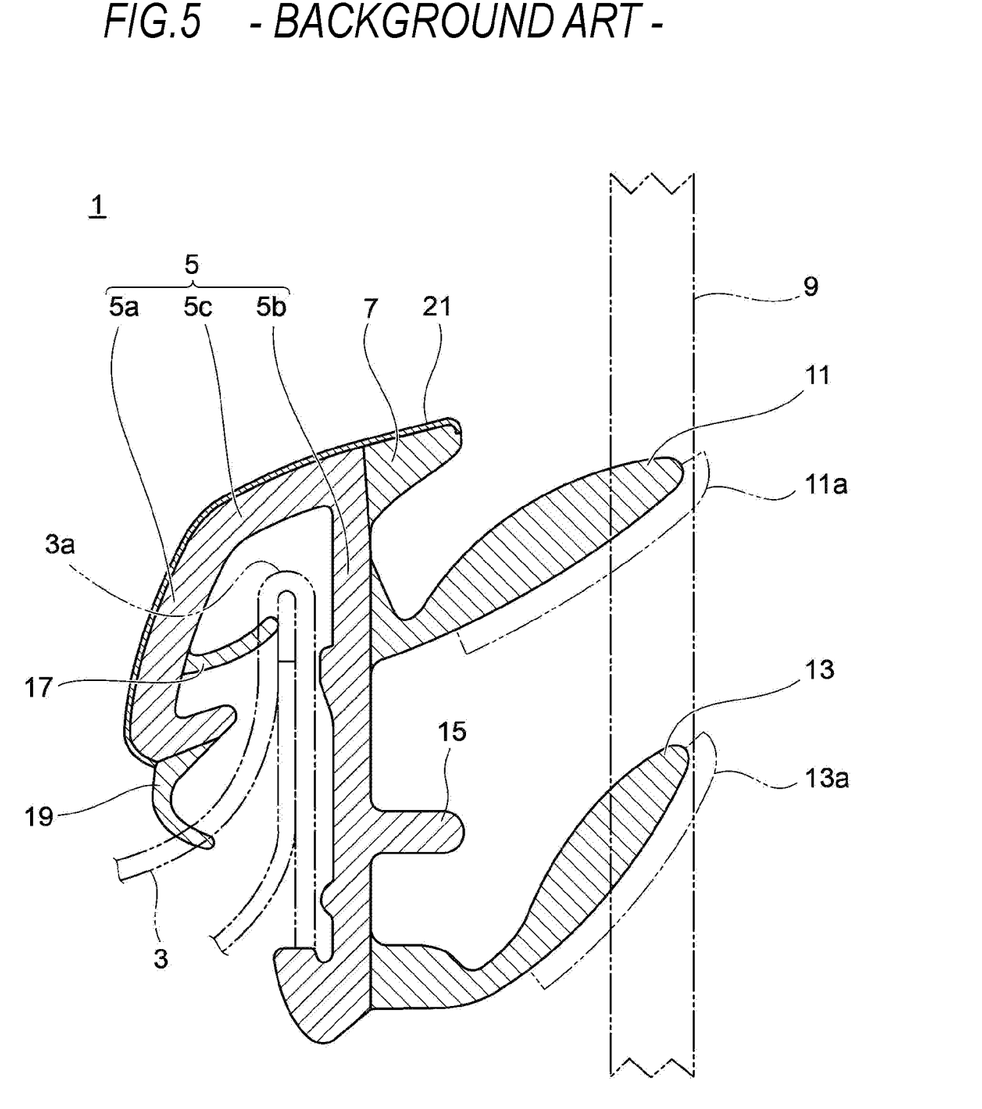
FIG. 5 is a cross-sectional view of a background belt molding.

FIG. 5 is a cross-sectional view of a background belt molding. In the drawing, a belt molding 1 is formed in an upper edge 3a of an outer panel 3 of a vehicle door.

The belt molding 1 includes a molding body 5, which includes an outer wall 5a, an inner wall 5b, and a connection wall 5c that connects an upper end of the outer wall 5a and an upper end of the inner wall 5 and which is made of a resin (for example, a soft resin such as polypropylene (PP)) and sandwiches the upper edge 3a of the outer panel 3.

A design lip 7 made of a resin (a softer resin than the molding body 5, for example, Thermo-PolyOlefin (TPO) based soft resin) of a different material from the molding body 5 is formed at an upper end of an interior-side surface of the inner wall 5b of the molding body 5. The design lip 7 is formed to partially cover the gap between the molding body 5 and the sliding glass 9 so as to improve the design property.

Further, an upper sealing lip 11 and a lower sealing lip 13 configured to make slidably contact with the sliding glass 9 capable of moving up and down are formed on the interior-side surface of the inner wall 5b of the molding body 5. The upper sealing lip 11 and the lower sealing lip 13 are made of a softer resin (for example, Thermo-PolyOlefin (TPO) based soft resin) than the molding body 5. Bristles 11a and 13a to remove dust (dirt) and water attached to the surface of the sliding glass 9 are formed on the side surfaces on the interior side, of the upper sealing lip 11 and the lower sealing lip 13.

A projection 15, which is made of the same material as the molding body 5 and is configured to make contact with the lower sealing lip 13 to prevent excessive bending of the lower sealing lip 13, is formed on a portion of the interior-side surface of the inner wall 5b of the molding body 5, between the upper sealing lip 11 and the lower sealing lip 13.

An inner lip 17 capable of contacting with the outer panel 3 is formed on the interior-side surface of the outer wall 5a of the molding body 5. Further, a body touch lip 19 capable of contacting with the outer panel 3 is formed at the lower end of the outer wall 5a of the molding body 5. The inner lip 17 and the body touch lip 19 are made of a softer resin (for example, Thermo-PolyOlefin (TPO) based soft resin) than the molding body 5.

A design portion 21 is formed so as to cross the exterior-side surfaces of the outer wall 5a and the connection wall 5c of the molding body 5 and the exterior-side surface of the design lip 7. The design portion 21 is made of a resin (for example, high-crystalline polypropylene) having higher mold shrinkage ratio than the molding body 5.

The molding body 5, the design lip 7, the upper sealing lip 11, the lower sealing lip 13, the inner lip 17, and the body touch lip 19 are integrally formed by extrusion molding (for example, see Japanese Patent Application Publication No. 2010-285130).

SUMMARY

A molten resin shrinks as it cools, and then a depression called a "sink mark" is formed on the surface of a resin molded product molded by extrusion molding or injection molding when a molten resin shrinks. Specifically, in a case where the resin molded product is made of a plurality of resins having different shrinkage ratio, sink marks is caused at the boundaries between different materials.

Figure 6:
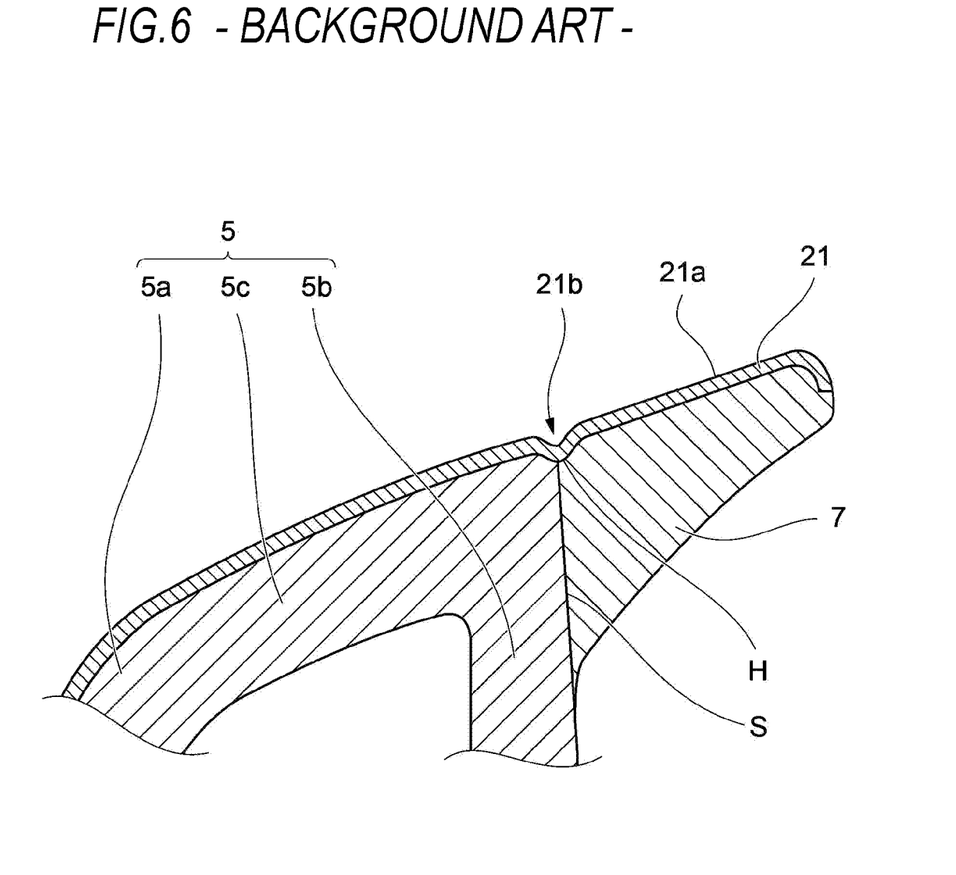
FIG. 6 is an enlarged view at the boundary between a design lip and a molding body illustrated in FIG. 5.

In the configuration illustrated in FIG. 5, as illustrated in FIG. 6 being an enlarged view of the boundary between the design lip 7 and the molding body 5 illustrated in FIG. 5, a sink mark H is caused at the boundary between the design lip 7 and the inner wall 5b of the molding body 5.

Specifically, when the sink mark H is caused so as to cross the boundary S between the design lip 7 and the inner wall 5b of the molding body 5, a depression 21b is formed on a design surface 21a of the design portion 21. Since the depression 21b appears to the outside, an appearance is deteriorated.

In order to remove to the sink mark H, a method of shaping with anticipating the amount of deformation resulting from the "sink mark" may be used. However, although this method can make the sink mark H less noticeable, it is difficult to eliminate the sink mark H completely. Thus, the depression 21b is formed on the design portion 21, so that an appearance is deteriorated.

This disclosure has been made in view of the problems, and an object thereof is to provide a belt molding having a good appearance.

In consideration of the above, a belt molding according to this disclosure includes: a molding body, which is made of a resin and includes an inner wall, an outer wall, and a connection wall that connects an upper end of the inner wall and an upper end of the outer wall; a design lip, which is formed at the upper end of the inner wall of the molding body and made of a resin different from the molding body; and a design portion, which covers at least a part of the molding body and at least a part of the design lip and is made of a resin different from the molding body, wherein the design portion includes a first portion, which covers at least the part of the molding body, and a second portion, which covers at least the part of the design lip, and wherein a step is formed between the first portion and the second portion, such that a level of a surface of the first portion is different from a level of a surface of the second portion.

The other features of this disclosure will become more apparent from the embodiment of this disclosure and the accompanying drawings.

According to the belt molding of this disclosure, a step is formed between the exterior-side surface of the design portion facing the molding body and the exterior-side surface of the design portion facing the design lip.

Therefore, even when a depression resulting from a sink mark is formed between the exterior-side surface of the design portion facing the molding body and the exterior-side surface of the design portion facing the design lip due to a difference between the materials of the molding body and the design lip, the depression will be unnoticeable, so that an appearance is improved if the step is formed so that a boundary of the step is within the depression.

The other effects of this disclosure will become more apparent from the embodiment of this disclosure and the accompanying drawings.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Embodiment

Figure 3:
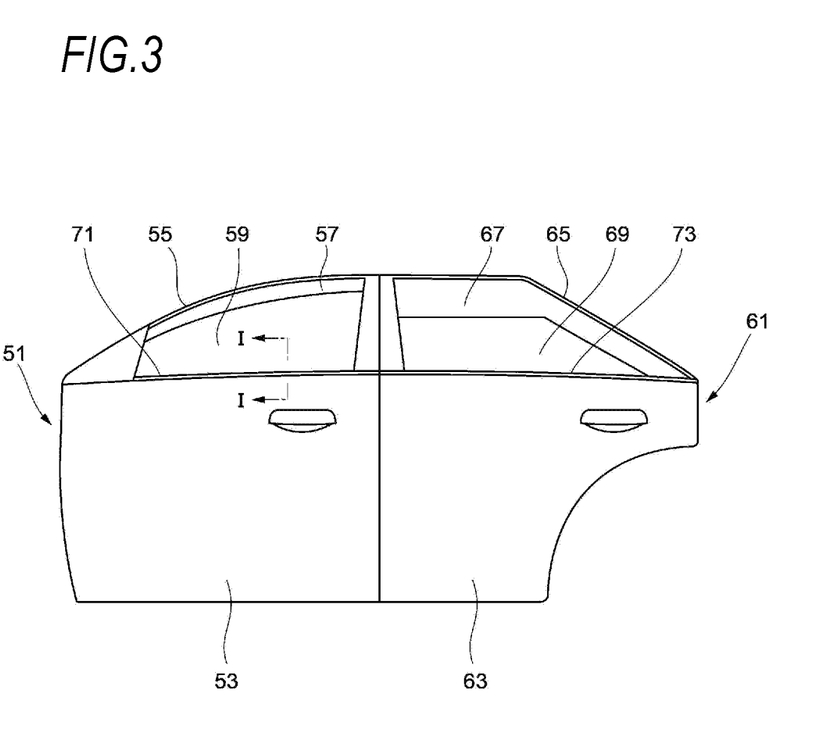
FIG. 3 is a side view of a vehicle in which the belt molding according to the first embodiment.

FIG. 3 is a side view of a vehicle in which a belt molding according to a first embodiment is formed. A door chassis 55 and an outer panel 53 of a front door 51 are made of metal, and a window hole 57 is formed between the outer panel 53 and the door chassis 55. A sliding glass 59 positioned between the outer panel 53 and an inner panel (not illustrated) is formed in the window hole 57 so as to be capable of moving up and down.

Similarly, a door chassis 65 and an outer panel 63 of a rear door 61 are made of metal, and a window hole 67 is formed between the outer panel 63 and the door chassis 65. A sliding glass 69 positioned between the outer panel 63 and an inner panel (not illustrated) is formed in the window hole 67 so as to be movable up and down.

A belt molding 71 is attached to an upper edge of the outer panel 53 of the front door 51. A belt molding 73 is also attached to an upper edge of the outer panel 63 of the rear door 61. The belt moldings 71 and 73 have a long and thin shape that extends in a front-rear direction of the front door 51 and the rear door 61, respectively, and have approximately the same cross-sectional shape.

The belt molding 71 attached to the front door 51 will be described, and the description of the belt molding 73 attached to the rear door 61 will be omitted.

Figure 1:
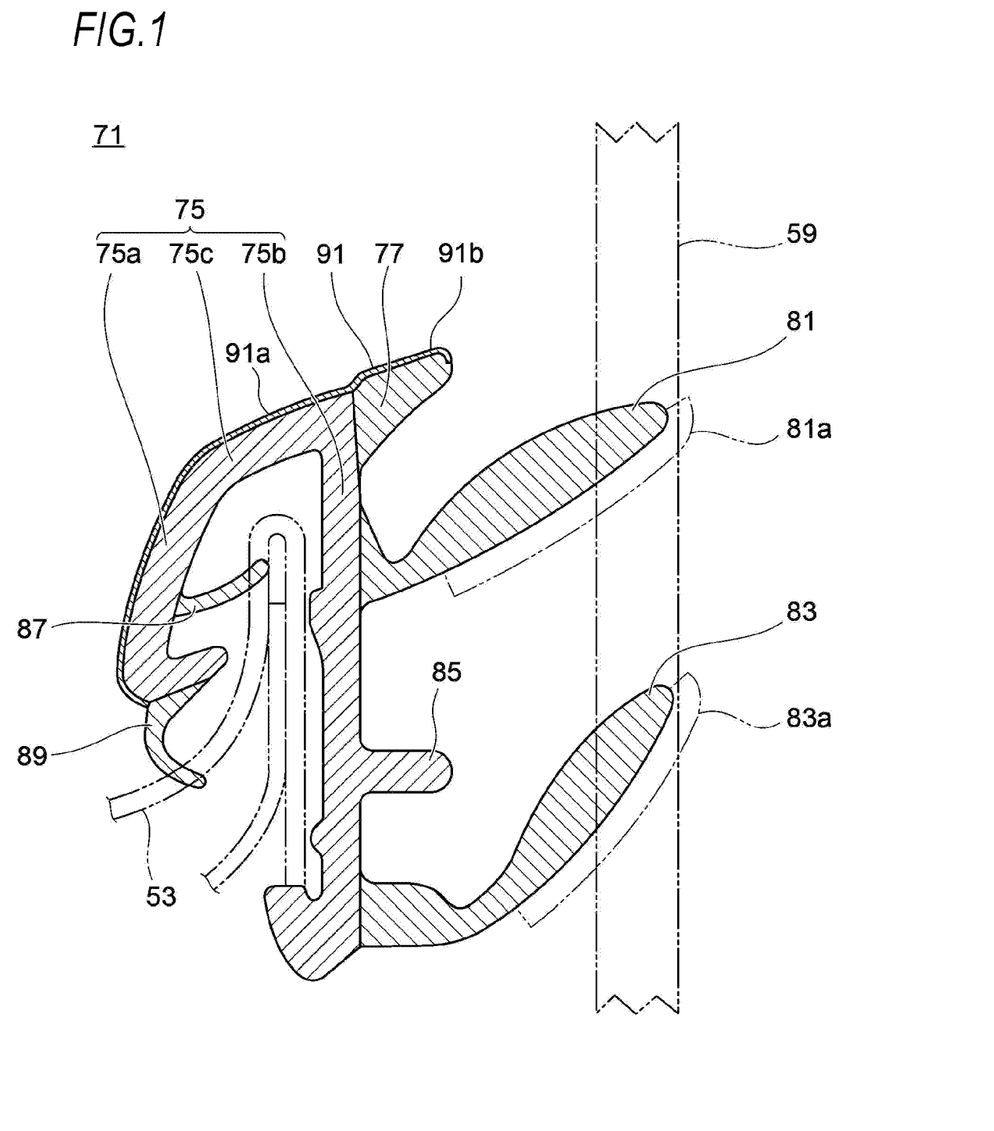
FIG. 1 is a view to explain a cross-section of a belt molding according to a first embodiment and is a cross-sectional view along line I-I in FIG. 2.
Figure 2:
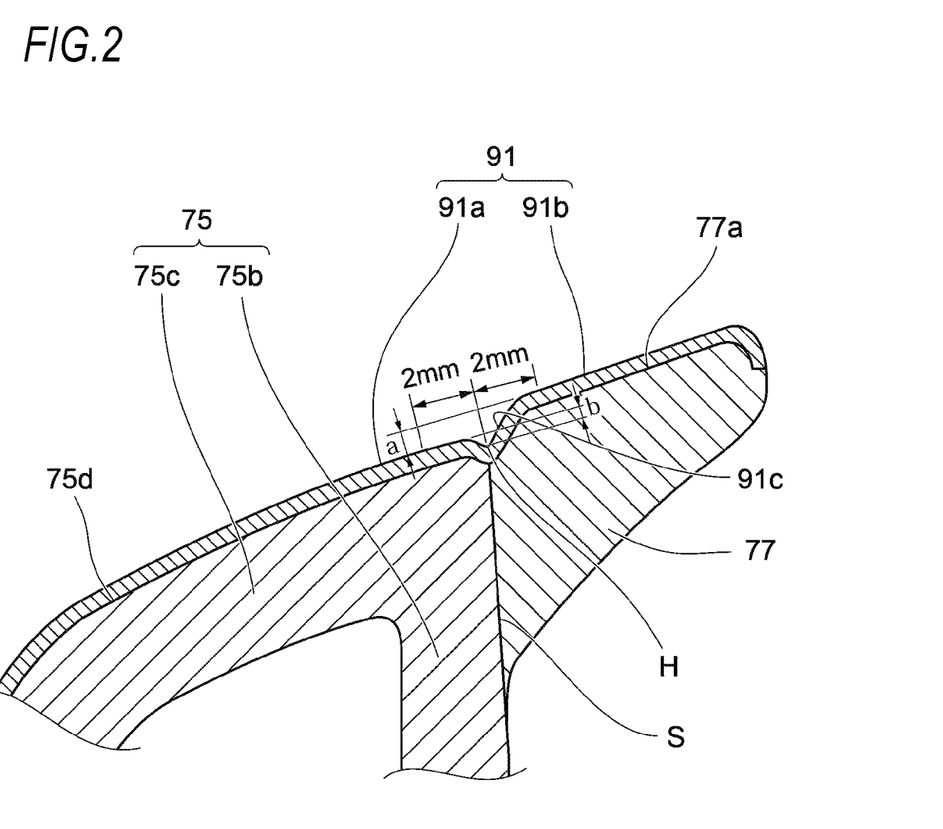
FIG. 2 is an enlarged view at the boundary between a design lip and a molding body illustrated in FIG. 1.

FIG. 1 is a view illustrating a cross-section of the belt molding 71 according to the embodiment and is a cross-sectional view along line I-I in FIG. 3, and FIG. 2 is an enlarged view at the boundary between a molding body and a design lip illustrated in FIG. 1.

The belt molding 71 includes an outer wall 75a, an inner wall 75b, a connection wall 75c that connects an upper end of the outer wall 75a and an upper end of the inner wall 75b. Further, the belt molding 71 includes a molding body 75 that is made of a resin (for example, a soft resin such as PolyPropylene (PP)) and sandwiches an upper edge 53a of the outer panel 53.

A design lip 77 made of a resin (a softer resin than the molding body 75, for example, Thermo-PolyOlefin (TPO) based soft resin) of a different material from the molding body 75 is formed at an upper end of an interior-side surface of the inner wall 75b of the molding body 75. The design lip 77 is formed to partially cover the gap between the molding body 75 and the sliding glass 59 to improve the design property.

Further, an upper sealing lip 81 and a lower sealing lip 83 configured to make slidably contact with the sliding glass 59 capable of moving up and down are formed on the interior-side surface of the inner wall 75b of the molding body 75. The upper sealing lip 81 and the lower sealing lip 83 are made of a softer resin (for example, Thermo-PolyOlefin (TPO) based soft resin) than the molding body 75. Bristles 81a and 83a that remove dust (dirt) and water attached to the surface of the sliding glass 59 are formed on the side surfaces on the interior side, of the upper sealing lip 81 and the lower sealing lip 83.

A projection 85 which is made of the same material as the molding body 75 and is configured to make contact with the lower sealing lip 83 to prevent excessive bending of the lower sealing lip 83 is formed on a portion of the interior-side surface of the inner wall 75b of the molding body 75, between the upper sealing lip 81 and the lower sealing lip 83.

An inner lip 87 configured to make contact with the outer panel 53 is formed on the interior-side surface of the outer wall 75a of the molding body 75. A body touch lip 89 configured to make contact with the outer panel 53 is formed at the lower end of the outer wall 75a of the molding body 75. The inner lip 87 and the body touch lip 89 are made of a softer resin (for example, Thermo-PolyOlefin (TPO) based soft resin) than the molding body 75.

A design portion 91 is formed so as to cross the exterior-side surfaces of the outer wall 75a and the connection wall 75c of the molding body 75 and the exterior-side surface of the design lip 77. The design portion 91 is made of a resin (for example, high-crystalline polypropylene) having higher mold shrinkage ratio than the molding body 75.

The molding body 75, the design lip 77, the upper sealing lip 81, the lower sealing lip 83, the inner lip 87, and the body touch lip 89 are integrally formed by extrusion molding.

In the present embodiment, as illustrated in FIG. 2, in a design surface of the design portion 91, which is exposed to the outside, a step is formed between an exterior-side surface 91a of the design portion 91 facing the molding body 75 and an exterior-side surface 91b of the design portion 91 facing the design lip 77.

Specifically, the molding body 75 and the design lip 77 are formed so that a step is formed between a surface 75d of the molding body 75 facing the exterior-side surface 91a of the design portion 91 and a surface 77a of the design lip 77 facing the exterior-side surface 91b of the design portion 91. The surface 77a is higher than the surface 75d. The boundary of the step is a boundary S between the molding body 75 and the design lip 77. The thickness of the design portion 91 is constant.

Therefore, the step of the exterior-side surface 91b of the design portion 91 facing the design lip 77 is higher than the step of the exterior-side surface 91a of the design portion 91 facing the molding body 75.

Additionally, the sink mark H appears in the boundary S between the design lip 77 and the inner wall 75b of the molding body 75. In this embodiment, a height a of the step is larger than a depth b of the depression 91c.

According to the configuration, the following effects are obtained.

(1) A boundary S between the molding body 75 and the design lip 77 is set to a boundary of the step between the exterior-side surface 91a of the design portion 91 and the exterior-side surface 91b of the design portion 91.

Therefore, even when the sink mark H is caused in the boundary S between the design lip 77 and the inner wall 75b of the molding body 75 and a depression 91c is formed in the design portion 91 due to the sink mark H, since the step is formed between the exterior-side surface 91a of the design portion 91 and the exterior-side surface 91b of the design portion 91, the depression 91c will be unnoticeable, so that an appearance is improved.

(2) The level of the exterior-side surface 91b of the design portion 91 facing the design lip 77 is higher than the level of the exterior-side surface 91a of the design portion 91 facing the molding body 75.

Therefore, it is possible to prevent water adhering to the design lip 77 from flowing toward the molding body 75 and from entering into the front door 51 from between the inner panel (not illustrated) and the outer panel 53 of the front door 51.

This disclosure is not limited to the embodiment described above.

In the embodiment, although the boundary of the step is set to the boundary S between the molding body 75 and the design lip 77, the boundary is not limited thereto. The depression 91c will be unnoticeable, as long as the boundary of the step is within a range in which the sink mark H is formed (that is, a range in which the depression 91c formed by the sink mark H is formed), so that an appearance is improved. Additionally, in general, the depression 91c formed by the sink mark H extends approximately 2 mm toward the molding body 75 and approximately 2 mm toward the design lip 77 about the boundary S between the design lip 77 and the inner wall 75b of the molding body 75.

Meanwhile, as a structure for forming the step, the thickness of the design portion 91 may be changed so that a step is formed between the exterior-side surface 91a of the design portion 91 facing the molding body 75 and the exterior-side surface 91b of the design portion 91 facing the design lip 77.

Further, the design portion 91 of the present embodiment is configured to cover an entire region of the surface of the outer wall 75a of the molding body 75, the entire region of the exterior-side surface of the connection wall 75c, and the exterior-side surface of the design lip 77. However, the step of this disclosure can be formed as long as the design portion 91 covers at least a portion of the exterior-side surface of the molding body 75 and at least a portion of the exterior-side surface of the design lip 77.

In the embodiment, although the belt molding 71 of the front door 51 has been described, this disclosure can be naturally applied to the belt molding 73 of the rear door 61.

Second Embodiment

Figure 4:
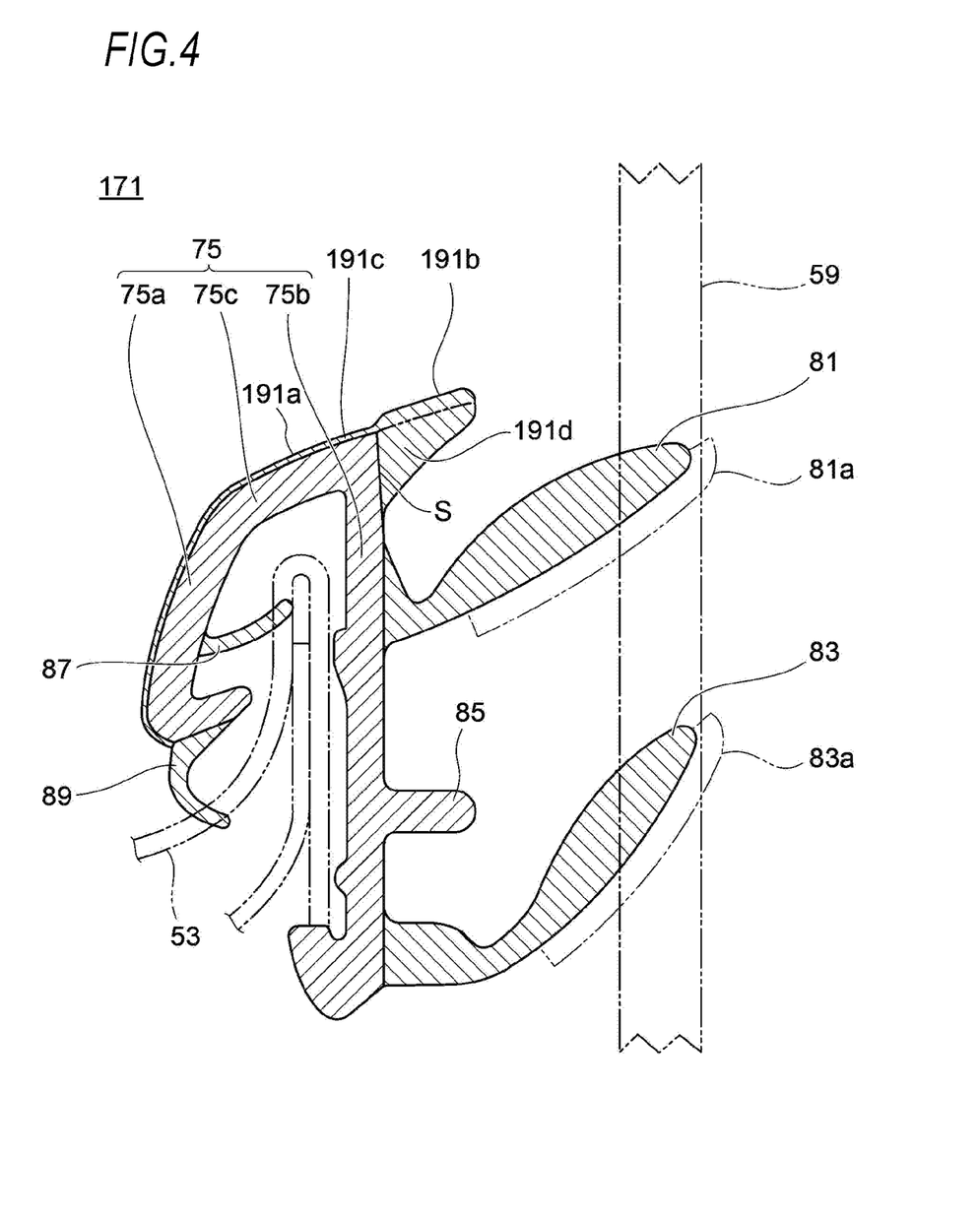
FIG. 4 is a view illustrating a second embodiment.

A second embodiment will be described with reference to FIG. 4 which is a cross-sectional view of a belt molding according to the second embodiment. A difference between the first and second embodiments is that the design portion and the design lip are made of materials different from those of the first embodiment, and the other portions are the same. Accordingly, the same and similar components as those of the first embodiment will be denoted by the same reference numerals, and the redundant description thereof will be omitted.

In the first embodiment, the design lip 77 and the design portion 91 are made of different materials. However, in the present embodiment, a design lip 191d and a design portion 191c are made of the same material as illustrated in FIG. 4.

The design lip 191d and the design portion 191c are made of a resin (a softer resin than the molding body 75, for example, Thermo-PolyOlefin (TPO) based soft resin) of a different material from the molding body 75.

A step is formed between an exterior-side surface 191a of the design portion 191c facing the molding body 75 and an exterior-side surface 191b of the design portion 191c facing the design lip 191d.

Specifically, the thickness of the design portion 191c is changed so that a step is formed between the exterior-side surface 191a of the design portion 191c facing the molding body 75 and the exterior-side surface 191b of the design portion 191 facing the design lip 191d. The boundary of the step is set to the boundary S between the molding body 75 and the design lip 191d. The surface 191b is higher than the surface 191a.

With such a configuration, the same effects as the first embodiment are obtained.

What is claimed is:

1. A belt molding comprising:
   a molding body, which is made of a resin and includes an inner wall, an outer wall, and a connection wall that connects an upper end of the inner wall and an upper end of the outer wall;
   a design lip, which is formed at the upper end of the inner wall of the molding body and made of a resin different from the molding body; and
   a design portion, which covers at least a part of the molding body and at least a part of the design lip and is made of a resin different from the molding body,
   wherein the design portion includes a first portion, which covers at least the part of the molding body, and a second portion, which covers at least the part of the design lip,
   wherein a step is formed between the first portion and the second portion, such that a level of a surface of the first portion is different from a level of a surface of the second portion, and
   wherein the first portion is directly coupled to the second portion.

2. The belt molding according to claim 1,
   wherein a level of the second portion is higher than a level of the first portion.

3. The belt molding according to claim 1,
   wherein a thickness of the first portion is the same as a thickness of the second portion, and
   wherein a level of the part of the design lip, which is covered by the second portion, is higher than a level of the part the part of the molding body, which is covered by the first portion.

4. The belt molding according to claim 1,
   wherein a thickness of the second portion is larger than a thickness of the first portion, and
   wherein a level of the part of the design lip, which is covered by the second portion, is the same as a level of the part the part of the molding body, which is covered by the first portion.

5. The belt molding according to claim 1,
   wherein a boundary of the step is set to a boundary between the molding body and the design lip.

6. The belt molding according to claim 1,
   wherein a depression is formed across a boundary between the molding body and the design lip, and
   wherein a boundary of the step is disposed in the depression.

7. The belt molding according to claim 6,
wherein a height of the step is larger than a depth of the depression.

8. The belt molding according to claim 1,
wherein the design portion comprises a different material from the design lip.

9. The belt molding according to claim 1, wherein the first portion of the design portion covers at least a part of a vehicle-exterior-side surface of the outer wall of the molding body.

10. The belt molding according to claim 1, wherein the first portion is thinner than the outer wall.

11. The belt molding according to claim 1, wherein the second portion of the design portion covers at least a part of a vehicle-exterior-side surface of the design lip of the molding body.

12. The belt molding according to claim 1, wherein the second portion is thinner than the design lip.

13. The belt molding according to claim 1, wherein the design portion crosses over a boundary between the molding body and the design lip.

14. The belt molding according to claim 1, wherein the design portion comprises a layer shape.

15. The belt molding according to claim 1, wherein the design lip is formed at the upper end of an interior-side surface of the inner wall of the molding body.

16. The belt molding according to claim 1, further comprising:
an upper sealing lip;
a lower sealing lip; and
a projection formed between the upper sealing lip and the lower sealing lip.

17. The belt molding according to claim 16, wherein the upper sealing lip, the projection, and the lower sealing lip are formed on an interior-side surface of the inner wall, and
wherein the projection is configured to make contact with the lower sealing lip to prevent excessive bending of the lower sealing lip.

18. The belt molding according to claim 1, wherein the molding body and the design lip are formed such that the step is formed between a first molding body surface of the molding body facing an exterior-side surface of the design portion and a first design lip surface of the design lip facing the exterior-side surface of the design portion.

19. The belt molding according to claim 18, wherein the step of the exterior-side surface of the design portion facing the design lip is higher than the step of the exterior-side surface of the design portion facing the molding body.

20. The belt molding according to claim 1, wherein the design portion is formed so as to cross exterior-side surfaces of the outer wall and the connection wall of the molding body and the exterior-side surface of the design lip, the design portion being a continuous body.

* * * * *